US005723802A

United States Patent [19]

Johnson et al.

[11] Patent Number: 5,723,802

[45] Date of Patent: *Mar. 3, 1998

[54] MUSIC INSTRUMENT WHICH GENERATES A RHYTHM EKG

[75] Inventors: Charles L. Johnson, Cambridge, Mass.; Allan A. Miller, Hollis, N.H.; Herbert P. Snow, Somerville, Mass.; Vernon A. Miller, Mount Vernon, N.H.

[73] Assignee: Virtual Music Entertainment, Inc., Andover, Mass.

[ * ] Notice: The term of this patent shall not extend beyond the expiration date of Pat. No. 5,393,926.

[21] Appl. No.: 590,131

[22] Filed: Jan. 23, 1996

Related U.S. Application Data

[63] Continuation of Ser. No. 177,741, Jan. 5, 1994, Pat. No. 5,491,297, which is a continuation-in-part of Ser. No. 73,128, Jun. 7, 1993, Pat. No. 5,393,926.

[51] Int. Cl.[6] .............................. G09B 15/04; G10H 1/26

[52] U.S. Cl. .............................................. 84/609; 84/477 R

[58] Field of Search ..................... 84/609–614, 634–638, 84/645, 477 R, 478, DIG. 22

[56] References Cited

U.S. PATENT DOCUMENTS 4,960,031 10/1990 Farrand .
5,074,182 12/1991 Capps et al. .
5,099,738 3/1992 Hotz .
5,146,833 9/1992 Lui .
5,270,475 12/1993 Weiss et al. .
5,287,789 2/1994 Zimmerman .

*Primary Examiner*—Stanley J. Witkowski
*Attorney, Agent, or Firm*—Fish & Richardson P.C.

[57] ABSTRACT

A musical instrument including an actuator which generates a plurality of signals in response to being played by a user; an audio synthesizer which generates audio tones in response to control signals; a memory storing a musical score for the actuator; a video display unit; and a digital processing means controlling the audio synthesizer and the video display unit. The stored musical score includes a sequence of lead notes each of which has an associated time stamp to identify a time at which it is supposed to be played in the musical score. The digital processing means is programmed to map the plurality of signals to a corresponding subsequence of lead notes from among the sequence of lead notes; it is programmed to produce a sequence of control signals from the subsequence of lead notes for causing the synthesizer to generate sounds representing the subsequence of lead notes; it is programmed to display on the video display unit a trace indicating when the lead notes of the sequence of lead notes are supposed to be played by the user as a function of time; and it is programmed to display relative to that trace an indicator marking where the user is supposed to be within the musical score as a function of an elapsed real time.

14 Claims, 7 Drawing Sheets

```
main ()
        {
100 ~ system_initialization()
102 ~ register_midi_callback(virtual_guitar_callback);
104 ~ while (continue)
        {
106 ~     get_song_id_from_user();
108 ~     set_up_data_structures(song_id);
110 ~     initialize_data_structures(song_id);
112 ~     play_song(song_id);
        }
        }
```

FIG. 5

```
play_song(song_id)
        {
130 ~ announce_song_to_user();
132 ~ wait_for_user_start_signal();
134 ~ start_interleaved_audio_video(song_id);
        }
```

FIG. 6

```
virtual_guitar_callback()
        {
200 ~ current_time = get_current_time();
202 ~ event_type = get_guitar_string_event(&string_id, &string_velocity);
204 ~ switch (event_type)

          case STRING_ON :

     210 ~ if (current_frame_idx != get_hframe(current_time)
            then
              {
       212 ~ current_frame_idx = get_hframe(current_time);
       214 ~ start_tone_gen(string_velocity, string_id,
                   lnotes_array[sframes[current_frame_idx].lnote_idx]);
       215 ~ current_lead_note_idx = lnotes_array[sframes[
                   current_frame_idx].lnote_idx]
       216 ~ hnotes_played = 0;
              }
     218 ~ else
              {
       220 ~ diff_time = current_time-last_time;
       222 ~ if (diff_time< SIMULTAN_THRESHOLD)
              then
         224 ~ start_tone_gen(string_velocity, string_id,
                 hnotes_array[current_lead_note_idx]
                 .hnotes[hnotes_played++]);
```

FIG. 7A

```
                else
                     {
      226 ——  start_tone_gen(string_velocity, string_id,
                                lnotes_array[++current_lead_note_idx]);
      228 ——  hnotes_played = 0;

        case STRING_OFF :
230 ——  unsound_note(string_id);

        case TREMELO :
232 ——  pass_tremelo_control_data();
     }
}
```

FIG. 7B

```
struct sync_frame {
      TIMESTAMP_VALUE     frame_start_time;
      TIMESTAMP_VALUE     frame_end_time;
      int                 lnote_idx;
      }
```

FIG. 8

```
struct lead_note {
      int                 lead_note;
      TIMESTAMP_VALUE     time;
      }
```

FIG. 9

```
struct harmony_notes {
      int hnote_cnt;
      int hnotes[10];
      };
```

FIG. 10

MUSIC INSTRUMENT WHICH GENERATES A RHYTHM EKG

This application is a continuation of U.S. patent application Ser. No. 08/177,741 filed on Jan. 5, 1994 (issued as U. S. Pat. No. 5,491,297), which is in turn a continuation-in-part of U.S. patent application Ser. No. 08/073,128, filed on Jun. 7, 1993 (issued as U.S. Pat. No. 5,393,926).

BACKGROUND OF THE INVENTION

The invention relates to microprocessor-assisted musical instruments.

As microprocessors penetrate further into the marketplace, more products are appearing that enable people who have no formal training in music to actually produce music like a trained musician. Some instruments and devices that are appearing store the musical score in digital form and play it back in response to input signals generated by the user when the instrument is played. Since the music is stored in the instrument, the user need not have the ability to create the required notes of the melody but need only have the ability to recreate the rhythm of the particular song or music being played. These instruments and devices are making music much more accessible to everybody.

Among the instruments that are available, there are a number of mechanical and electrical toy products that allow the player to step through the single tones of a melody. The simplest forms of this are little piano shaped toys that have one or a couple of keys which when depressed advance a melody by one note and sound the next tone in the melody which is encoded on a mechanical drum. The electrical version of this ability can be seen in some electronic keyboards that have a mode called "single key" play whereby a sequence of notes that the player has played and recorded on the keyboard can be "played" back by pushing the "single key play" button (on/off switch) sequentially with the rhythm of the single note melody. Each time the key is pressed, the next note in the melody is played.

There was an instrument called a "sequential drum" that behaved in a similar fashion. When the drum was struck a piezoelectric pickup created an on/off event which a computer registered and then used as a trigger to sound the next tone in a melodic note sequence.

There are also recordings that are made for a variety of music types where a single instrument or, more commonly, the vocal part of a song is omitted from the audio mix of an ensemble recording such as a rock band or orchestra. These recordings available on vinyl records, magnetic tape, and CDs have been the basis for the commercial products known as MusicMinusOne and for the very popular karoeke that originated in Japan.

SUMMARY OF THE INVENTION

In general, in one aspect, the invention features a virtual musical instrument including a multi-element actuator which generates a plurality of signals in response to being played by a user; an audio synthesizer which generates audio tones in response to control signals; a memory storing a musical score for the multi-element actuator; and a digital processor receiving the plurality of signals from the multi-element actuator and generating a first set of control signals therefrom. The musical score includes a sequence of lead notes and an associated sequence of harmony note arrays, each harmony note array of the sequence corresponding to a different one of the lead notes and containing zero, one or more harmony notes. The digital processor is programmed to identify from among the sequence of lead notes in the stored musical score a lead note which corresponds to a first one of the plurality of signals. It is programmed to map a set of the remainder of the plurality of signals to whatever harmony notes are associated with the selected lead note, if any. And it is programmed to produce the first set of control signals from the identified lead note and the harmony notes to which the signals of the plurality of signals are mapped, the first set of control signals causing the synthesizer to generate sounds representing the identified lead note and the mapped harmony notes.

Preferred embodiments include the following features. The multi-element actuator is an electronic musical instrument, namely, a MIDI guitar, and the plurality of multi-element actuators includes strings on the guitar. The virtual musical instrument further includes a timer resource which generates a measure of elapsed time, wherein the stored musical score contains time information indicating when notes of the musical score can be played and wherein the digital processor identifies the lead note by using the timer resource to measure a time at which the first one of the plurality of signals occurred and then locating a lead note within the sequence of lead notes that corresponds to the measured time. The digital processor is further programmed to identify a member of the set of the remainder of the plurality of signals by using the timer resource to measure a time that has elapsed since a preceding signal of the plurality of signals occurred, by comparing the elapsed time to a preselected threshold, and if the elapsed time is less than the preselected threshold, by mapping the member of the set of the remainder of the plurality of signals to a note in the harmony array associated with the identified lead note. The digital processor is also programmed to map the member of the remainder of the plurality of signals to a next lead note if the elapsed time is greater than the preselected threshold.

In general, in another aspect, the invention features a virtual musical instrument including an actuator generating a signal in response to being activated by a user; an audio synthesizer; a memory storing a musical score for the actuator; a timer; and a digital processor receiving the signal from the actuator and generating a control signal therefrom. The stored musical score includes a sequence of notes partitioned into a sequence of frames, each frame of the sequence of frames containing a corresponding group of notes of the sequence of notes and wherein each frame of the sequence of frames has a time stamp identifying its time location within the musical score. The digital processor is programmed to use the timer to measure a time at which the signal is generated; it is programmed to identify a frame in the sequence of frames that corresponds to that measured time; it is programmed to select one member of the group of notes for the identified frame; and it is programmed to generate the control signal, wherein the control signal causes the synthesizer to generate a sound representing the selected member of the group of notes for the identified frame.

In preferred embodiments, the virtual musical instrument further includes an audio playback component for storing and playing back an audio track associated with the stored musical score. In addition, the digital processor is programmed to start both the timer and the audio playback component at the same time so that the identified frame is synchronized with the playback of the audio track. The audio track omits a music track, the omitted music track being the musical score for the actuator. The virtual musical instrument also includes a video playback component for storing and playing back a video track associated with the stored musical score. The digital processor starts both the timer and the video playback component at the same time so that the identified frame is synchronized with the playback of the video track.

In general, in yet another aspect, the invention features a control device including a medium containing stored digital information, the stored digital information including a musical score for the virtual instrument previously described and wherein the musical score is partitioned into a sequence of frames.

In general, in still another aspect, the invention features a method for producing a digital data file for a musical score. The method includes the steps of generating a digital data sequence corresponding to the notes in the musical score; partitioning the data sequence into a sequence of frames, some of which contain more than one note of the musical score; assigning a time stamp to each of the frames, the time stamp for any given frame representing a time at which that frame occurs in the musical score; and storing the sequence of frames along with the associated time stamps on a machine readable medium.

In preferred embodiments, the time stamp for each of the frames includes a start time for that frame and an end time for that frame. The musical score includes chords and the step of generating a digital data sequence includes producing a sequence of lead notes and a corresponding sequence of harmony note arrays, each of the harmony note arrays corresponding to a different one of the lead notes in the sequence of lead notes and each of the harmony note arrays containing the other notes of any chord to which that lead note belongs.

In general, in still another aspect, the invention is a musical instrument including an actuator which generates a plurality of signals in response to being played by a user; an audio synthesizer which generates audio tones in response to control signals; a memory storing a musical score for the actuator; a video display unit; and a digital processing means controlling the audio synthesizer and the video display unit. The stored musical score includes a sequence of lead notes each of which has an associated time stamp to identify a time at which it is supposed to be played in the musical score. The digital processing means is programmed to map the plurality of signals to a corresponding subsequence of lead notes from among the sequence of lead notes; it is programmed to produce a sequence of control signals from the subsequence of lead notes for causing the synthesizer to generate sounds representing the subsequence of lead notes; and it is programmed to display a song EKG on the video display unit. The song EKG is a trace indicating when the lead notes of the sequence of lead notes are supposed to be played by the user as a function of time and it includes an indicator relative marking where the user is supposed to be within the musical score as a function of an elapsed real time.

One advantage of the invention is that, since the melody notes are stored in a data file, the player of the virtual instrument need not know how to create the notes of the song. The player can produce the required sounds simply by generating activation signals with the instrument. The invention has the further advantage that it assures that the player of the virtual instrument will keep up with the song but yet gives the player substantial latitude in generating the music within predefined frames of the musical score. In addition, the invention enables user to produce one or more notes of a chord based on the number of strings (in the case of a guitar) that he strikes or strums. Thus, even though the actual musical core may call for a chord at a particular place in the song, the player of the musical instrument can decide to generate less than all of the notes of that chord.

The rhythm EKG provides an effective tool for helping novices to learn how to play the musical instrument.

Other advantages and features will become apparent from the following description of the preferred embodiment, and from the claims.

BRIEF DESCRIPTION OF THE DRAWINGS

FIG. 5 shows a pseudocode representation of the main program loop;

FIG. 6 shows a pseudocode representation of the play_song( ) routine that is called by the main program lop;

FIGS. 7A and 7B show a pseudocode representation of the virtual_guitar_callback( ) interrupt routine that is installed during initialization of the system;

FIG. 8 shows the sync_frame data structure;

FIG. 9 shows the lead_note data structure;

FIG. 10 shows the harmony_notes data structure;

DESCRIPTION OF THE PREFERRED EMBODIMENTS

Figure 1:
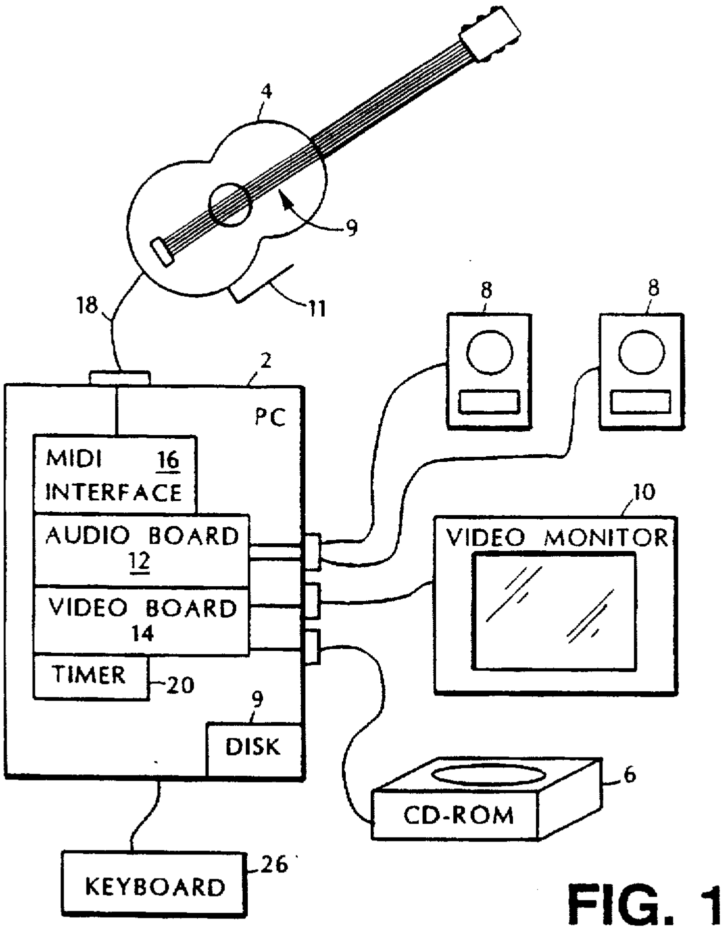
FIG. 1 is a block diagram of the virtual music system.

Referring to FIG. 1, a virtual music system constructed in accordance with the invention includes among its basic components a Personal Computer (PC) 2; a virtual instrument, which in the described embodiment is a MIDI guitar 4; and a CD-ROM player 6. Under control of PC 2, CD-ROM player 6 plays back an interleaved digital audio and video recording of a song that a user has selected as the music that he also wishes to play on guitar 4. Stored in PC 2 is a song data file (not shown in FIG. 1) that contains a musical score that is to be played by MIDI guitar 4. It is, of course, for the guitar track of the same song that is being played on CD-ROM player 6.

MIDI guitar 4 is a commercially available instrument that includes a multi-element actuator, referred to more commonly as a set of strings 9, and a tremelo bar 11. Musical Instrument Digital Interface (MIDI) refers to a well known standard of operational codes for the real time interchange of music data. It is a serial protocol that is a superset of RS-232. When an element of the multi-element actuator (i.e., a string) is struck, guitar 4 generates a set of digital opcodes describing that event. Similarly, when tremelo bar 11 is used, guitar 4 generates an opcode describing that event. As the user plays guitar 4, it generates a serial data stream of such "events" (i.e., string activations and tremelo events) that are sent to PC 2 which uses them to access and thereby play back the relevant portions of the stored song in PC 2. PC 2 mixes the guitar music with the audio track from CD-ROM player and plays the resulting music through a set of stereo speakers 8 while at the same time displaying the accompanying video image on a video monitor 10 that is connected to PC 2.

Figure 2:
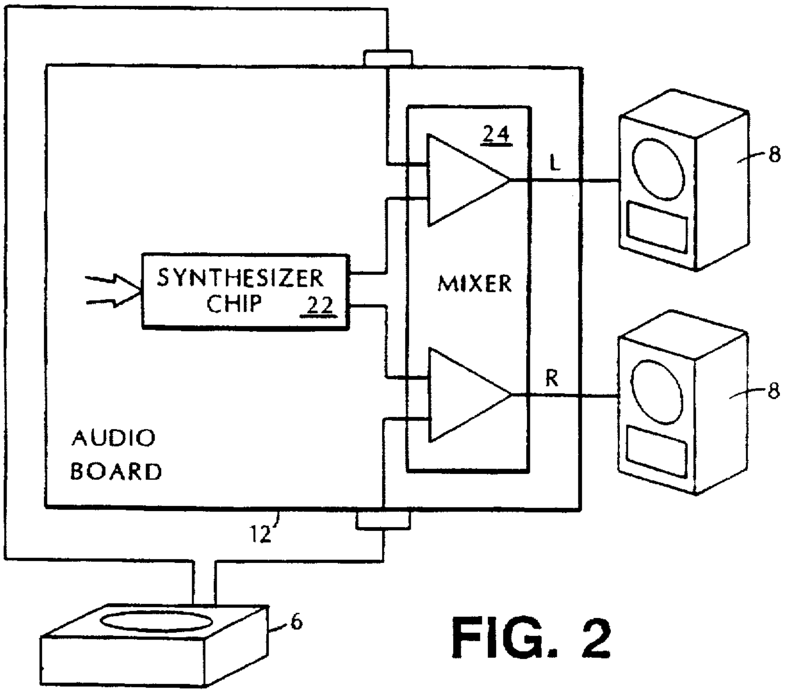
FIG. 2 is a block diagram of the audio processing plug-in board shown in FIG. 1.

PC 2, which includes a 80486 processor, 16 megabytes of RAM, and 1 gigabyte of hard disk storage 9, uses a Microsoft™ Windows 3.1 Operating System. It is equipped with several plug-in boards. There is an audio processing plug-in board 12 (also shown in FIG. 2) which has a built in programmable MIDI synthesizer 22 (e.g. a Proteus synthesis chip) and a digitally programmable analog 2 channel mixer 24. There is also a video decompression/accelerator board 14 running under Microsoft's VideoForWindows™ product for creating full-screen, full motion video from the video signal coming from CD-ROM player 6. And there is a MIDI interface card 16 to which MIDI guitar 4 is connected through a MIDI cable 18. PC 2 also includes a programmable timer chip 20 that updates a clock register every millisecond.

On audio processing plug-in board 12, Proteus synthesis chip 22 synthesizes tones of specified pitch and timbre in response to a serial data stream that is generated by MIDI guitar 4 when it is played. The synthesis chip includes a digital command interface that is programmable from an application program running under Windows 3.1. The digital command interface receives MIDI formatted data that indicate what notes to play at what velocity (i.e., volume). It interprets the data that it receives and causes the synthesizer to generate the appropriate notes having the appropriate volume. Analog mixer 24 mixes audio inputs from CD-ROM player 9 with the Proteus chip generated waveforms to create a mixed stereo output signal that is sent to speakers 8. Video decompression/accelerator board 14 handles the accessing and display of the video image that is stored on a CD-ROM disc along with a synchronized audio track. MIDI interface card 16 processes the signal from MIDI guitar 4.

When MIDI guitar 4 is played, it generates a serial stream of data that identifies what string was struck and with what force. This serial stream of data passes over cable 18 to MIDI interface card 16, which registers the data chunks and creates interrupts to the 80486. The MIDI Interface card's device driver code which is called as part of the 80486's interrupt service, reads the MIDI Interface card's registers and puts the MIDI data in an application program accessible buffer.

MIDI guitar 4 generates the following type of data. When a string is struck after being motionless for some time, a processor within MIDI guitar 4 generates a packet of MIDI formatted data containing the following opcodes:

MIDI_STATUS=On

MIDI_NOTE=<note number)

MIDI_VELOCITY=<amplitude>

The <note number> identifies which string was activated and the <amplitude> is a measure of the force with which the string was struck. When the plucked string's vibration decays to a certain minimum, then MIDI guitar 4 sends another MIDI data packet:

MIDI_STATUS=Off

MIDI_NOTE=<note number)

MIDI_VELOCITY=0

This indicates that the tone that is being generated for the string identified by <note number> should be turned off.

If the string is struck before its vibration has decayed to the certain minimum, MIDI guitar 4 generates two packets, the first turning off the previous note for that string and the second turning on a new note for the string.

The CD-ROM disc that is played on player 6 contains an interleaved and synchronized video and audio file of music which the guitar player wishes to play. The video track could, for example, show a band playing the music, and the audio track would then contain the audio mix for that band with the guitar track omitted. The VideoForWindows product that runs under Windows 3.1 has an API (Application Program Interface) that enables the user to initiate and control the running of these Video-audio files from a C program.

The pseudocode for the main loop of the control program is shown in FIG. 5. The main program begins execution by first performing system initialization (step 100) and then calling a register_midi_callback( ) routine that installs a new interrupt service routine for the MIDI interface card (step 102). The installed interrupt service effectively "creates" the virtual guitar. The program then enters a while-loop (step 104) in which it first asks the user to identify the song which will be played (step 106). It does this by calling a get_song_id_from_user( ) routine. After the user makes his selection using for example a keyboard 26 (see FIG. 1) to select among a set of choices that are displayed on video monitor 10, the user's selection is stored in a song_id variable that will be used as the argument of the next three routines which the main loop calls. Prior to beginning the song, the program calls a set_up_data_structures( ) routine that sets up the data structures to hold the contents of the song data file that was selected (step 108). The three data structures that will hod the song data are sframes[ ], lnote_array[ ], and hnotes_array[ ].

During this phase of operation, the program also sets up a timer resource on the PC that maintains a clock variable that is incremented every millisecond and it resets the millisecond clock variable to 0. As will become more apparent in the following description, the clock variable serves to determine the user's general location within the song and thereby identify which notes the user will be permitted to activate through his instrument. The program also sets both a current_frame_idx variable and a current_lead_note_idx variable to 0. The current_frame_idx variable, which is used by the installed interrupt routine, identifies the frame of the song that is currently being played. The current_lead_note_idx variable identifies the particular note within the lead_note array that is played in response to a next activation signal from the user.

Next, the program calls another routine, namely, initialize_data_structures( ), that retrieves a stored file image of the Virtual Guitar data for the chosen song from the hard disk and loads that data into the three previously mentioned arrays (step 110). After the data structures have been initialized, the program calls a play_song( ) routine that causes PC 2 to play the selected song (step 112).

Referring to FIG. 6, when play_song( ) is called, it first instructs the user graphically that it is about to start the song (optional) (step 130). Next, it calls another routine, namely, wait_for_user_start_signal( ), which forces a pause until the user supplies a command which starts the song (step 132). As soon as the user supplies the start command, the play_song routine starts the simultaneous playback of the stored accompaniment, i.e., the synchronized audio and video tracks on CD-ROM player 6 (step 134). In the described embodiment, this is an interleaved audio/video (.avi) file that is stored on a CD-ROM. It could, of course, be available in a number of different forms including, for example, a .WAV digitized audio file or a Red Book Audio track on the CD-ROM peripheral.

Since the routines are "synchronous" (i.e. do not return until playback is complete), the program waits for the return of the Windows Operating System call to initiate these playbacks. Once the playback has been started, every time a MIDI event occurs on the MIDI guitar (i.e., each time a string is struck), the installed MIDI interrupt service routine processes that event. In general, the interrupt service routine calculates what virtual guitar action the real MIDI guitar event maps to.

Figure 3:
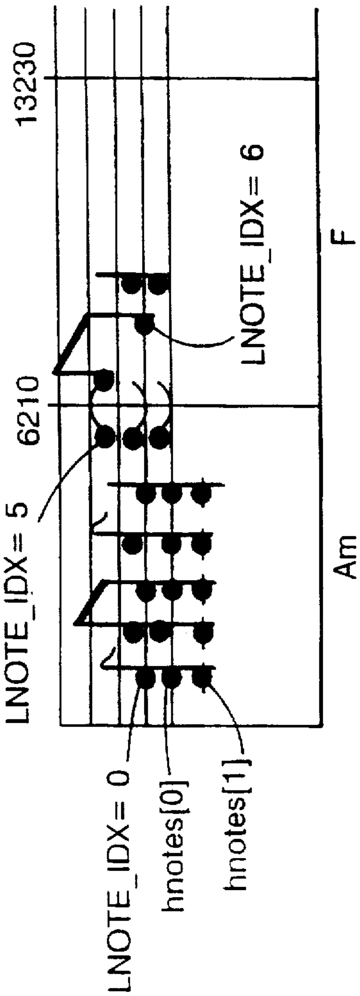
FIG. 3 illustrates the partitioning of a hypothetical musical score into frames.

Before examining in greater detail the data structures that are set up during initialization, it is useful first to describe the song data file and how it is organized. The song data file contains all of the notes of the guitar track in the sequence in which they are to be played. As illustrated by FIG. 3, which shows a short segment of a hypothetical score, the song data is partitioned into a sequence of frames 200, each one typically containing more than one and frequently many notes or chords of the song. Each frame has a start time and an end time, which locate the frame within the music that will be played. The start time of any given frame is equal to the end time of the previous frame plus 1 millisecond. In FIG. 3, the first frame extends from time 0 to time 6210 (i.e., 0 to 6.21 seconds) and the next frame extends from 6211 to 13230 (i.e., 6.211 to 13.23 seconds). The remainder of the song data file is organized in a similar manner.

In accordance with the invention, the guitar player is able to "play" or generate only those notes that are within the "current" frame. The current frame is that frame whose start time and end time brackets the current time, i.e., the time that has elapsed since the song began. Within the current frame, the guitar player can play any number of the notes that are present but only in the order in which they appear in the frame. The pace at which they are played or generated within the time period associated With the current frame is completely determined by the user. In addition, the user by controlling the number of string activations also controls both the number of notes of a chord that are generated and the number of notes within the frame that actually get generated. Thus, for example, the player can play any desired number of notes of a chord in a frame by activating only that number of strings, i.e., by strumming the guitar. If the player does not play the guitar during a period associated with a given frame, then none of the music within that frame will be generated. The next time the user strikes or activates a string, then the notes of a later frame, i.e., the new current frame, will be generated.

Note that the pitch of the sound that is generated is determined solely by information that is stored the data structures containing the song data. The guitar player needs only activate the strings. The frequency at which the string vibrates has no effect on the sound generated by the virtual music system. That is, the player need not fret the strings while paying in order to produce the appropriate sounds.

It should be noted that the decision about where to place the frame boundaries within the song image is a somewhat subjective decision, which depends upon the desired sound effect and flexibility that is given to the user. There are undoubtedly many ways to make these decisions. Chord changes could, for example, be used as a guide for where to place frame boundaries. Much of the choice should be left to the discretion of the music arranger who builds the database. As a rule of thumb, however, the frames should probably not be so long that the music when played with the virtual instrument can get far out of alignment with the accompaniment and they should not be so short that the performer has no real flexibility to modify or experiment with the music within a frame.

For the described embodiment, an ASCI editor was used to create a text based file containing the song data. Generation of the song data file can, of course, be done in many other ways. For example, one could produce the song data file by first capturing the song information off of a MIDI instrument that is being played and later add frame delimiters in to that set of data.

Figure 4:
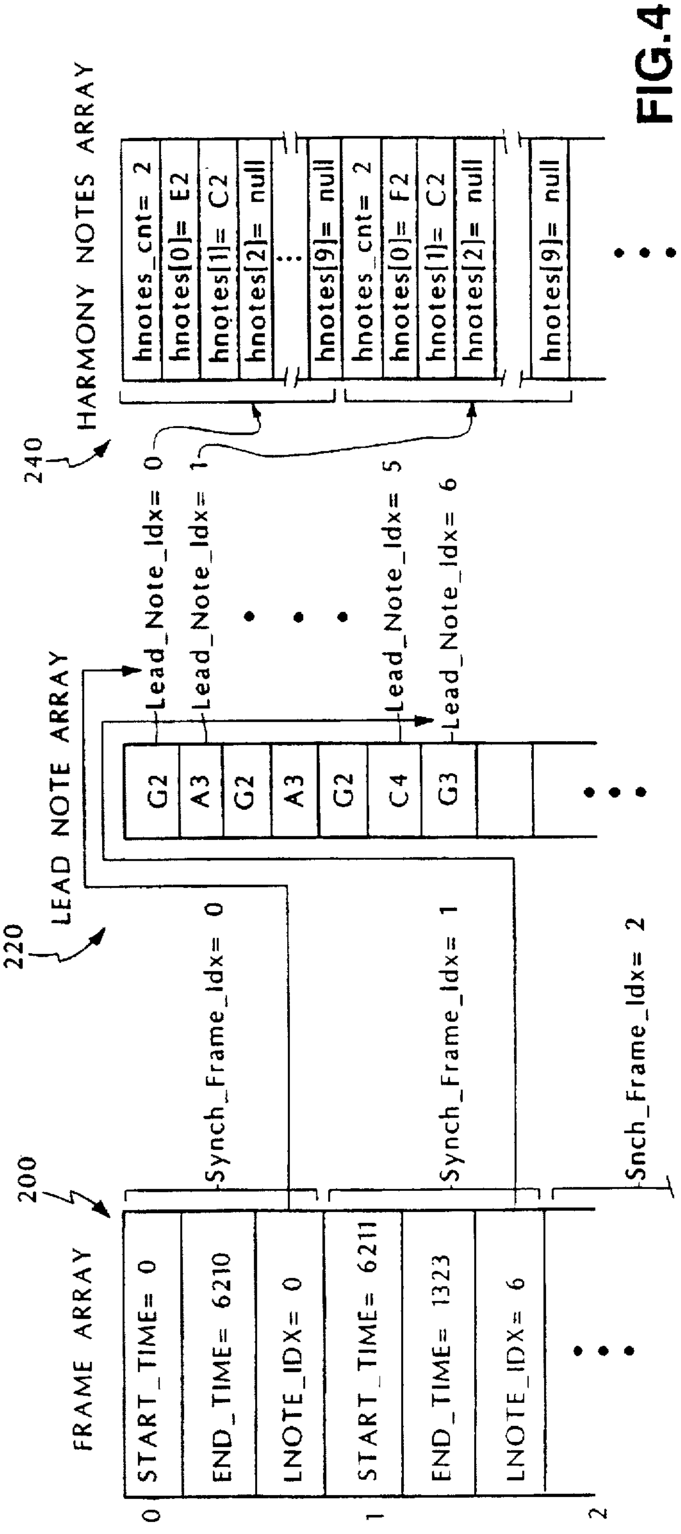
FIG. 4 shows the sframes[ ], lnote_array[ ], and hnotes_array[ ] data structures and their relationship to one another.

With this overview in mind, we now turn to a description of the previously mentioned data structures, which are shown in FIG. 4. The sframes[ ] array 200, which represents the sequence of frames for the entire song, is an array of synch_frame data structures, one of which is shown in FIG. 8. Each synch_frame data structure contains a frame_start_time variable that identifies the start time for the frame, a frame_end_time variable that identifies the send time of the frame and a lnote_idx variable that provides an index into both a lnote_array[ ] data structure 220 and an hnotes_array[ ] data structure 240.

The lnote_array[ ] 220 is an array of lead_note data structures, one of which is shown in FIG. 9. The lnote_array[ ] 220 represents a sequence of single notes (referred to as "lead notes") for the entire song in the order in which they are played. Each lead_note data structure represents a singly lead note and contains two entries, namely, a lead_note variable that identifies the pitch of the corresponding lead note, and a time variable, which precisely locates the time at which the note is supposed to be played in the song. If a single note is to be played at some given time, then that note is the lead note. If a chord is to be played at some given time, then the lead note is one of the notes of that chord and hnote_array[ ] data structure 240 identifies the other notes of the chord. Any convention can be used to select which note of the chord will be the lead note. In the described embodiment, the lead note is the chord note with the highest pitch.

The hnote_array[ ] data structure 240 is an array of harmony_note data structures, one of which is shown in FIG. 10. The lnote_idx variable is an index into this array. Each harmony_note data structure contains an hnote_cnt variable and an hnotes[ ] array of size 10. The hnotes[ ] array specifies the other notes that are to be played with the corresponding lead note, i.e., the other notes in the chord. If the lead note is not part of a chord, the hnotes[ ] array is empty (i.e., its entries are all set to NULL). The hnote_cnt variable identifies the number of non-null entries in the associated hnotes[ ] array. Thus, for example, if a single note is to be played (i.e., it s not part of a chord), the hnote_cnt variable in the harmony_note data structure for that lead note will be set equal to zero and all of the entries of the associated hnotes[ ] array will be set to NULL.

As the player hits strings on the virtual guitar, the Callback routine which will be described in greater detail in next section is called for each event. After computing the harmonic frame, chord index and sub-chord index, this callback routine instructs the Proteus Synthesis chip in PC * to create a tone of the pitch that corresponds to the given frame, chord, sub-chord index. The volume of that tone will be based on the MIDI velocity parameter received with the note data from the MIDI guitar.

Virtual Instrument Mapping

FIGS. 7A and 7B show pseudocode for the MIDI interrupt callback routine, i.e., virtual_guitar_callback( ). When invoked the routine invokes a get_current_time( ) routine which uses the timer resource to obtain the current time (step 200). It also calls another routine, i.e., get_guitar_string_event(&string_id, &string_velocity), to identify the event that was generated by the MIDI guitar (step 202). This returns the following information: (1) the type of event (i.e., ON, OFF, or TREMELO control); (2) on which string the event occurred (i.e. string_id); and (3) if an ON event, with what velocity the string was struck (i.e. string_velocity).

The interrupt routine contains a switch instruction which runs the code that is appropriate for the event that was generated (step 204). In general, the interrupt handler maps the MIDI guitar events to the tone generation of the Proteus Synthesis chip. Generally, the logic can be summarized as follows:

If an ON STRING EVENT has occurred, the program checks whether the current time matches the current frame (210). This is done by checking the timer resource to determine how much time on the millisecond clock has elapsed since the start of the playback of the Video/Audio file. As noted above, each frame is defined as having a start time and an end time. If the elapsed time since the start of playback falls between these two times for a particular frame then that frame is the correct frame for the given time (i.e., it is the current frame). If the elapsed time falls outside of the time period of a selected frame, then it is not the current frame but some later frame is.

If the current time does not match the current frame, then the routine moves to the correct frame by setting a frame variable i.e., current_frame_idx, to the number of the frame whose start and end times bracket the current time (step 212). The current_frame_idx variable serves as an index into the sframe_array. Since no notes of the new frame have yet been generated, the event which is being processed maps to the first lead note in the new frame. Thus, the routine gets the first lead note of that new frame and instructs the synthesizer chip to generate the corresponding sound (step 214). The routine which performs this function is start_tone_gen( ) in FIG. 7A and its arguments include the string_velocity and string_id from the MIDI formatted data as well as the identity of the note from the lnotes_array. Before exiting the switch statement, the program sets the current_lead_note_idx to identify the current iead note (step 215) and it initializes an hnotes_played variable to zero (step 216). The hnotes_played variable determines which note of a chord is to be generated in response to a next event that occurs sufficiently close in time to the last event to qualify as being part of a chord.

In the case that the frame identified by the current_frame_idx variable is not the current frame (step 218), then the interrupt routine checks whether a computed difference between the current time and the time of the last ON event, as recorded in a last_time variable, is greater than a preselected threshold as specified by a SIMULTAN_THRESHOLD variable (steps 220 and 222). In the described embodiment, the preselected time is set to be of sufficient length (e.g. on the order of about 20 milliseconds) so as to distinguish between events within a chord (i.e., approximately simultaneous events) and events that are part of different chords.

If the computed time difference is shorter than the preselected threshold, the string ON event is treated as part of a "strum" or "simultaneous" grouping that includes the last lead note that was used. In this case, the interrupt routine, using the lnote_idx index, finds the appropriate block in the harmony_notes array and, using the value of the hnotes_played variable, finds the relevant entry in h_notes array of that block. It then passes the following information to the synthesizer (step 224):

string_velocity
string_id
hnotes_array[current_lead_note_idx].hnotes[hnotes_played++]

which causes the synthesizer to generate the appropriate sound for that harmony note. Note that the hnotes_played variable is also incremented so that the next ON event, assuming it occurs within a preselected time of the last ON event, accesses the next note in the hnote[ ] array.

If the computed time difference is longer than the preselected threshold, the string event is not treated as part of a chord which contained the previous ON event; rather it is mapped to the next lead note in the lead_note array. The interrupt routine sets the current_lead_note_idx index to the next lead note in the lead_note array and starts the generation of that tone (step 226). It also resets the hnotes_played variable to 0 in preparation for accessing the harmony notes associated with that lead note, if any (step 228).

If the MIDI guitar event is an OFF STRING EVENT, then the interrupt routine calls an unsound_note( ) routine which turns off the sound generation for that string (step 230). It obtains the string_id from the MIDI event packet reporting the OFF event and passes this to the unsound_note( ) routine. The unsound_note routine then looks up what tone is being generated for the ON Event that must have preceded this OFF event on the identified string and turns off the tone generation for that string.

If the MIDI guitar event is a TREMELO event, the tremelo information from the MIDI guitar gets passed directly to synthesizer chip which produces the appropriate tremelo (step 232).

In an alternative embodiment which implements what will be referred to as "rhythm EKG", the computer is programmed to display visual feedback to the user on video monitor 10. In general, the display of the rhythm EKG includes two components, namely, a trace of the beat that is supposed to be generated by the player (i.e., the "song EKG") and a trace of the beat that is actually generated by the player (i.e., the "player EKG"). The traces, which can be turned on and off at the option of the player, are designed to teach the player how to play the song, without having the threatening appearance of a "teaching machine". As a teaching tool, the rhythm EKG is applicable to both rhythm and lead guitar playing.

Figure 11:
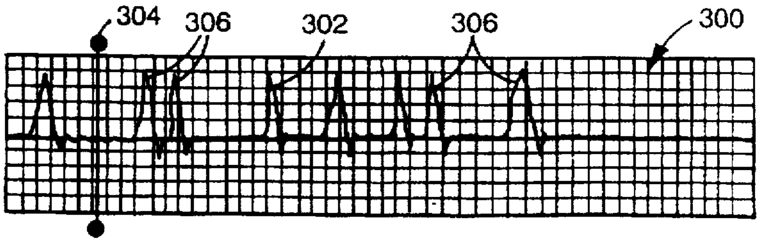
FIG. 11 shows a song EKG as displayed to a user.

Referring to FIG. 11, the main display of the "song EKG" which is meant to evoke the feeling of a monitored signal from a patient. The displayed image includes a grid 300, a rhythm or song trace 302 and a cursor 304. On grid 300, the horizontal axis corresponds to a time axis and the vertical axis corresponds to an event axis (e.g. the playing of a note or chord) but has no units of measure. The song trace 302 includes pulses 306 (i.e., a series of beats) which identify the times at which the player is supposed to generate notes or strums with the instrument. The program causes cursor 304 to move from left to right as the music plays thereby marking the real time that has elapsed since the beginning of the song, i.e., indicating where the player is supposed to be within the song. Cursor 304 passes the start of each beat just as the player is supposed to be starting the chord associated with that beat and it passes the peak of each beat just as the player is supposed to be finishing the chord.

To implement this feature, the program can use the time stamp that is supplied for each of the lead notes of the song (see FIG. 9). The time stamp for each lead note identifies the time at which the note is supposed to be played in the song. Alternatively, one can reduce the frame size to one note and use the beginning and ending time of each frame as the indicator of when to generate a pulse.

The program also includes two display modes, namely, a directionality mode and a volume mode, which are independent of each other so the player can turn on either or both of them.

Figure 12:
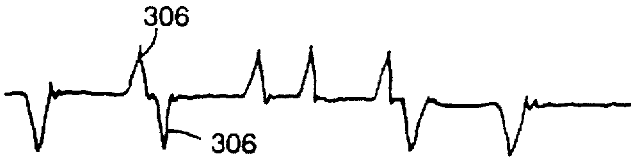
FIG. 12 shows a song EKG in which the displayed signal exhibits polarity to indicate direction of strumming.

Referring to FIG. 12, if the player optionally turns on the directionality mode, the beats are displayed in the negative direction when the player is supposed to be strumming down and in the positive direction when the player is supposed to be strumming up. The directionality information can be supplied in any of a number of ways. For example, it can be extracted from the direction of frequency change between the lead note and its associated harmony notes or it can be supplied by information added to the lead note data structure.

Figure 13:
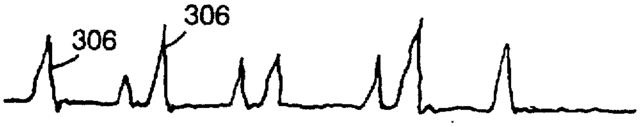
FIG. 13 shows a song EKG in which the amplitude of the peaks indicates the vigor with which the player should be strumming.

Referring to FIG. 13, if the player optionally turns on the volume mode, the size of the beats on the display indicates the vigor with which the player should be Strumming. A real "power chord" could be indicated by a pulse that goes offscale, i.e. the top of the pulse gets flattened. To implement this feature, volume information must be added to the data structure for either the lead notes or the harmony notes.

Figure 14:
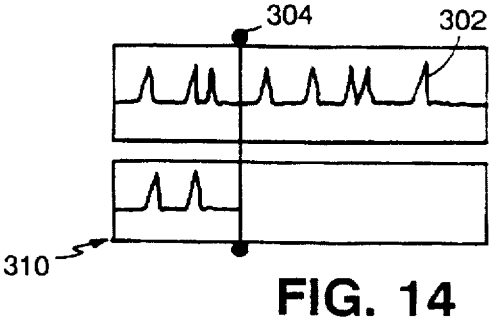
FIG. 14 shows a song EKG and a player EKG.

The player EKG, which is shown as trace 310 in FIG. 14, looks identical to the song EKG, and when it is turned on, cursor 304 extends down to cover both traces. The player EKG shows what the player is actually doing. Like the song EKG it too has optional directionality and volume modes.

Figure 15:
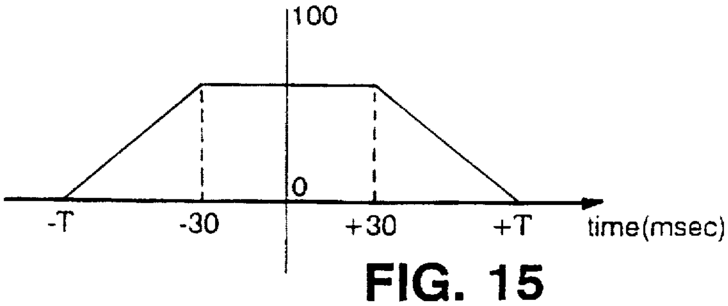
FIG. 15 shows a sample scoring algorithm for color coding the player EKG.

In the described embodiment, the program color codes the trace of the player EKG to indicate how close the player is to the song EKG. Each pulse is color coded to score the players performance. A green trace indicates that the player is pretty close; a red trace indicates that the player is pretty far off; and a yellow trace indicates values in between. A simple algorithm for implementing this color coded feedback uses a scoring algorithm based upon the function shown in FIG. 15. If the player generates the note or chord within ±30 msec of when it is supposed to be generated, a score of 100 is generated. The score for delays beyond that decreases linearly from 100 to zero at ±T, where T is about 100 msec. The value of T can be adjusted to set the difficulty level.

The algorithm for color coding the trace also implements a low pass filter to slow down the rate at which the colors are permitted to change and thereby produce a more visually pleasing result. Without the low pass filter, the color can change as frequently as the pulses appear.

It should be understood that the rhythm EKG can be used as part of the embodiment which also includes the previously described frame synchronization technique or by itself. In either event, it provides very effective visual feedback which assists the user in learning how to play the instrument.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed is:

1. A virtual musical instrument comprising:

an actuator generating an actuation signal in response to being activated by a user;

an audio synthesizer;

a memory storing a sequence of note structures representing a musical score for said actuator, each of the note structures of said sequence of note structures having associated therewith an indicator identifying a corresponding musical sound and having an associated time identifying when that musical sound is supposed to be played relative to a beginning time;

a timer resource;

a video display unit;

a video playback component for storing and playing back through said video display unit a video track associated with said stored musical score; and a digital processor receiving said signal from said actuator and generating a control signal therefrom, said digital processor programmed to use said timer resource to determine a time at which said actuation signal occurred, said digital processor programmed to select one of the note structures of the sequence of note structures that has an associated time that corresponds to the time at which said activation signal occurred, and said digital processor programmed to use the selected note structure to generate said control signal, wherein said control signal causes said synthesizer to generate the corresponding musical sound identified by the selected note structure, and wherein said digital processor is also programmed to start at the same time both said timer and playback of the video track on said video playback component so that the musical score is synchronized with the playback of said video track.

2. The virtual music instrument of claim 1 further comprising an audio playback component for storing and playing back an audio track associated with said stored musical score, and wherein said digital processing means is programmer to start both said timer resource and said audio playback component at the same time so that the musical score is synchronized with the playback of said audio track.

3. The virtual music instrument of claim 2 wherein said audio track omits a music track, said omitted music track being represented by the musical score for said actuator.

4. The virtual music instrument of claim 2 wherein both the audio and video playback component comprise a CD-ROM player.

5. The virtual music instrument of claim wherein said digital processor is programmed to display on said video display unit a trace of markers as a function of time, wherein each of the markers within said trace of markers indicates a time at which the user is supposed to cause said actuator to generate said actuation signal in order to cause the audio synthesizer to play the musical sound for a corresponding one of the sequence of note structures of said musical score, said trace of markers representing a period of time extending from before an actual elapsed time until after the actual elapsed time, the actual elapsed time being measured from a start of the musical score.

6. The virtual music instrument of claim 5 wherein said digital processor is also programmed to display on said video display unit an indicator marking a location of the actual elapsed time within said trace of markers and thereby indicating where the user is presently supposed to be within the musical score.

7. The virtual musical instrument of claim 6 wherein said digital processor is also programmed to generate on said video display unit a second trace next to said trace of markers indicating when the user actually caused said actuator to generate actuation signals and thereby indicating when the notes of said sequence of notes are actually played by said audio synthesizer relative to when they are supposed to be played as indicated by said trace of markers.

8. A control program tangibly stored on a digital storage medium for use with a virtual musical instrument that includes an actuator for generating a sequence of actuation signals in response to a corresponding sequence of activations of the actuator by a user, an audio component, a video playback component, a video display unit, and a digital processor receiving said sequence of actuation signals from said actuator and generating a corresponding sequence of control signals therefrom, and a digital storage device storing a sequence of note structures representing a musical score, wherein the digital storage medium is readable by the digital processor, and wherein the video playback component contains a pre-recorded video track associated with the musical score, said control program being configured to operate the virtual musical instrument to perform the functions of:

establishing a timer resource;

in response to receiving a start signal from the user, simultaneously starting the timer resource and playback of the pre-recorded video track on the video component so as to cause playback of the pre-recorded video track through the video display unit to be synchronized with the musical score; and in response to receiving each actuation signal of said sequence of actuation signals, (a) determining from the timer resource a time at which the received actuation signal occurred;

(b) selecting a corresponding one of the note structures in the sequence of note structures based on the time at which said received actuation occurred; and (c) generating a control signal from the selected note structure, wherein the control signal causes the audio component to generate the musical sound corresponding to the selected note structure.

9. The control program of claim 8 wherein each of the note structures of the sequence of note structures has associated therewith an indicator identifying a corresponding musical sound and has an associated time identifying when that musical sound is supposed to be played relative to a beginning time, and wherein the function of selecting a corresponding one of the note structures is accomplished by selecting a note structure among the sequence of note structures having an associated time which corresponds to the time at which the activation signal occurred.

10. The control program of claim 9 wherein the control program is further configured to operate the virtual musical instrument to perform the functions of causing any particular one of the musical sounds corresponding with the note structures of the sequence of note structures to be played through the audio unit only if the user causes an actuation signal to occur at a time corresponding to the note structure to which that musical sound corresponds.

11. A digital storage medium having a control program stored thereon for use with a virtual musical instrument that includes an actuator for generating a sequence of actuation signals in response to a corresponding sequence of activations of the actuator by a user, an audio component, a video playback component, a video display unit, a digital processor receiving said sequence of actuation signals from said actuator and generating a corresponding sequence of control signals therefrom, and a digital storage device storing a sequence of note structures representing a musical score, wherein digital storage medium is readable by the digital processor and the video playback component contains a pre-recorded video track associated with the stored musical score, said control program comprising:

means for establishing a timer resource;

means for simultaneously starting, in response to receiving a start signal from the user, the timer resource and playback of the pre-recorded video track on the video component so as to cause playback of the pre-recorded video track through the video display unit to be synchronized with the musical score;

means for mapping the sequence of activation signals to a corresponding plurality of note structures from the sequence of note structures, wherein each of the note structures of the sequence of note structures has associated therewith an indicator identifying a corresponding musical sound and has an associated time identifying when that musical sound is supposed to be played relative to a beginning time, and wherein the mapping is based upon a correspondence between times at which the activation signals occurred and the times associated with the note structures of the sequence of note structures; and means for causing the audio component to play the musical sounds associated with the plurality of note structures to which the sequence of activation signals is mapped.

12. A control program tangibly stored on a digital storage medium for use with a virtual musical instrument that includes an actuator for generating a sequence of actuation signals in response to a corresponding sequence of activations of the actuator by a user, an audio component, a digital processor receiving said sequence of actuation signals from said actuator and generating a corresponding sequence of control signals therefrom, and a digital storage device storing a sequence of note structures representing a musical score, wherein said digital storage medium is readable by the digital processor, said control program being configured to operate the virtual musical instrument to perform the functions of:

in response to receiving a start signal from the user, starting a timer resource; and in response to receiving each actuation signal of said sequence of actuation signals, (a) determining from the timer resource a time at which the received actuation signal occurred;

(b) selecting a corresponding one of the note structures in the sequence of note structures based on the time at which said received actuation occurred; and (c) generating a control signal from the selected note structure, wherein the control signal causes the audio component to generate the musical sound corresponding to the selected note structure.

13. The control program of claim 12 wherein each of the note structures of the sequence of note structures has associated therewith an indicator identifying a corresponding musical sound and has an associated time identifying when that musical sound is supposed to be played relative to a beginning time, and wherein the function of selecting a corresponding one of the note structures is accomplished by selecting a note structure among the sequence of note structures having an associated time which corresponds to the time at which the activation signal occurred.

14. The control program of claim 13 wherein the control program is further configured to operate the virtual musical instrument to perform the functions of causing any particular one of the musical sounds corresponding with the note structures of the sequence of note structures to be played through the audio unit only if the user causes an actuation signal to occur at a time corresponding to the note structure to which that musical sound corresponds.

* * * * *